(12) United States Patent
Wei et al.

(10) Patent No.: US 8,572,567 B2
(45) Date of Patent: Oct. 29, 2013

(54) SPECIFYING AND PROCESSING COMPOSED PATTERNS

(75) Inventors: Yi-Hsiu Wei, Austin, TX (US); Geoffrey Martin Hambrick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 12/816,617

(22) Filed: Jun. 16, 2010

(65) Prior Publication Data
US 2011/0314369 A1    Dec. 22, 2011

(51) Int. Cl.
*G06F 9/44*    (2006.01)

(52) U.S. Cl.
USPC ........................................... 717/123

(58) Field of Classification Search
USPC .................. 717/105–109, 117, 123
See application file for complete search history.

(56) References Cited

U.S. PATENT DOCUMENTS

| | | | |
|---|---|---|---|
| 2003/0115572 A1* | 6/2003 | Zondervan et al. | 717/109 |
| 2005/0166193 A1* | 7/2005 | Smith et al. | 717/143 |
| 2006/0089828 A1 | 4/2006 | Larsen et al. | |
| 2007/0006121 A1 | 1/2007 | Jezierski et al. | |
| 2007/0022403 A1 | 1/2007 | Brandt et al. | |
| 2007/0050358 A1 | 3/2007 | Ganesh et al. | |
| 2007/0174413 A1 | 7/2007 | Cuddihy et al. | |
| 2008/0097630 A1 | 4/2008 | Weatherhead et al. | |
| 2008/0097740 A1 | 4/2008 | Beaton et al. | |
| 2008/0288944 A1 | 11/2008 | Coqueret et al. | |
| 2009/0094576 A1 | 4/2009 | Bouchard, Sr. et al. | |
| 2009/0138293 A1 | 5/2009 | Lane et al. | |
| 2009/0307662 A1* | 12/2009 | Ackerman | 717/120 |

OTHER PUBLICATIONS

Sohail et al., "Designing verifiable and reusable data access layer using formal methods and design patterns," Feb. 2009.

* cited by examiner

*Primary Examiner* — Anna Deng
(74) *Attorney, Agent, or Firm* — Holland & Knight LLP; Brian J. Colandreo, Esq.; Jeffrey T. Placker, Esq.

(57) ABSTRACT

A method, computer program product, and system for specifying and processing composed patterns. A method may include receiving, by a pattern process executing on a computing device, a first pattern definition including one or more outputs. The method may further include receiving, by the pattern process executing on the computing device, a second pattern definition including one or more inputs. The method may also include creating, by the pattern process executing on the computing device, a map between at least one of the one or more outputs and at least one of the one or more inputs if a type of the at least one of the one or more outputs matches a type of the at least one of the one or more inputs.

20 Claims, 6 Drawing Sheets

SPECIFYING AND PROCESSING COMPOSED PATTERNS

BACKGROUND OF THE INVENTION

This disclosure relates to specifying and processing composed patterns and, more particularly, to methodologies for facilitating the combination of composed software patterns in a development environment.

Developing reliable information technology software may pose a challenge to business organization and the software industry. A variety of functional and nonfunctional requirements may need to be met in projects which may have tight resource and schedule constraints. Combining software patterns may rely on architects to document steps of applying multiple patterns in a recipe. The project team may manually follow the recipe to create a solution appropriate to a domain.

This manual approach may be time consuming. Further, the manual approach may be error prone. It may also require practitioners to have a high degree of skills. As such, there may be a need to improve ways in which software patterns are combined.

BRIEF SUMMARY OF THE INVENTION

In a first embodiment, a method may comprise receiving, by a pattern process executing on a computing device, a first pattern definition comprising one or more outputs. The method may further comprise receiving, by the pattern process executing on the computing device, a second pattern definition comprising one or more inputs. The method may also comprise creating, by the pattern process executing on the computing device, a map between at least one of the one or more outputs and at least one of the one or more inputs if a type of the at least one of the one or more outputs matches a type of the at least one of the one or more inputs. Additionally, the method may comprise producing, by the pattern process executing on the computing device, a new pattern definition comprising the first pattern definition, the second pattern definition, and the map.

One or more of the following features may be included. The first pattern definition may further comprise one or more inputs. The second pattern definition may further comprise one or more outputs. The new pattern definition may comprise one or more inputs matching the one or more inputs of the first pattern definition and one or more outputs matching the one or more outputs of the second pattern definition. The method may further comprise providing input data to the one or more inputs of the new pattern. The method may also comprise executing the new pattern with the input data to produce output data based upon, at least in part, the input data. The method may additionally comprise presenting a graphical user interface on a computer display. The graphical user interface may include one or more of an icon representing the first pattern definition, an icon representing the second pattern definition, one or more icons representing the one or more inputs, one or more icons representing the one or more outputs; and a graphical element representing the map. The graphical user interface may allow a user to manipulate at least the graphical element representing the map and produce a request to map at least one of the one or more outputs to at least one of the one or more inputs.

In some implementations, producing the new pattern definition may comprise generating an XML document defining at least the first pattern definition, the second pattern definition, the one or more inputs, the one or more outputs, and the map. Creating the map may further comprise type checking the one or more inputs and the one or more outputs to determine whether the one or more inputs can be mapped to the one or more outputs. The method may further comprise retrieving the first pattern definition and the second pattern definition from a pattern repository. The method may also comprise storing the new pattern definition in the pattern repository. A new pattern definition may be retrieved from the pattern repository. The new pattern definition may be executed to produce the results of the first pattern definition, the second pattern definition, and the map. The new pattern definition may also be mapped to one or more additional pattern definitions retrieved from the pattern repository.

In second embodiment, a computer program product may reside on a computer readable storage medium and may have a plurality of instructions stored on it. When executed by a processor, the instructions may cause the processor to perform operations comprising receiving, by a pattern process, a first pattern definition comprising one or more outputs. The operations may further comprise receiving, by the pattern process, a second pattern definition comprising one or more inputs. The operations may also comprise creating, by the pattern process, a map between at least one of the one or more outputs and at least one of the one or more inputs if a type of the at least one of the one or more outputs matches a type of the at least one of the one or more inputs. The operations may additionally comprise producing, by the pattern process, a new pattern definition comprising the first pattern definition, the second pattern definition, and the map.

One or more of the following features may be included. The first pattern definition may further comprise one or more inputs. The second pattern definition may further comprise one or more outputs. The new pattern definition may comprise one or more inputs matching the one or more inputs of the first pattern definition and one or more outputs matching the one or more outputs of the second pattern definition. The operations may further comprise providing input data to the one or more inputs of the new pattern. The operations may also comprise executing the new pattern with the input data to produce output data based upon, at least in part, the input data. The operations may additionally comprise presenting a graphical user interface on a computer display. The graphical user interface may include one or more of an icon representing the first pattern definition, an icon representing the second pattern definition, one or more icons representing the one or more inputs, one or more icons representing the one or more outputs; and a graphical element representing the map. The graphical user interface may allow a user to manipulate at least the graphical element representing the map and produce a request to map at least one of the one or more outputs to at least one of the one or more inputs.

In some implementations, producing the new pattern definition may comprise generating an XML document defining at least the first pattern definition, the second pattern definition, the one or more inputs, the one or more outputs, and the map. Creating the map may further comprise type checking the one or more inputs and the one or more outputs to determine whether the one or more inputs can be mapped to the one or more outputs. The operations may further comprise retrieving the first pattern definition and the second pattern definition from a pattern repository. The operations may also comprise storing the new pattern definition in the pattern repository. A new pattern definition may be retrieved from the pattern repository. The new pattern definition may be executed to produce the results of the first pattern definition, the second pattern definition, and the map. The new pattern definition may also be mapped to one or more additional pattern definitions retrieved from the pattern repository.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to receive, by a pattern process executing on a computing device, a first pattern definition comprising one or more outputs. Further, the computing system may include a second software module configured to receive, by the pattern process executing on the computing device, a second pattern definition comprising one or more inputs. The computing system may also include a third software module configured to create, by the pattern process executing on the computing device, a map between at least one of the one or more outputs and at least one of the one or more inputs if a type of the at least one of the one or more outputs matches a type of the at least one of the one or more inputs. Additionally, the computing system may also include a fourth software module configured to produce, by the pattern process executing on the computing device, a new pattern definition comprising the first pattern definition, the second pattern definition, and the map.

One or more of the following features may be included. The first pattern definition may further comprise one or more inputs. The second pattern definition may further comprise one or more outputs. The new pattern definition may comprise one or more inputs matching the one or more inputs of the first pattern definition and one or more outputs matching the one or more outputs of the second pattern definition.

The details of one or more implementations are set forth in the accompanying drawings and the description below. Other features and advantages will become apparent from the description, the drawings, and the claims.

DETAILED DESCRIPTION OF THE INVENTION

Figure 1:
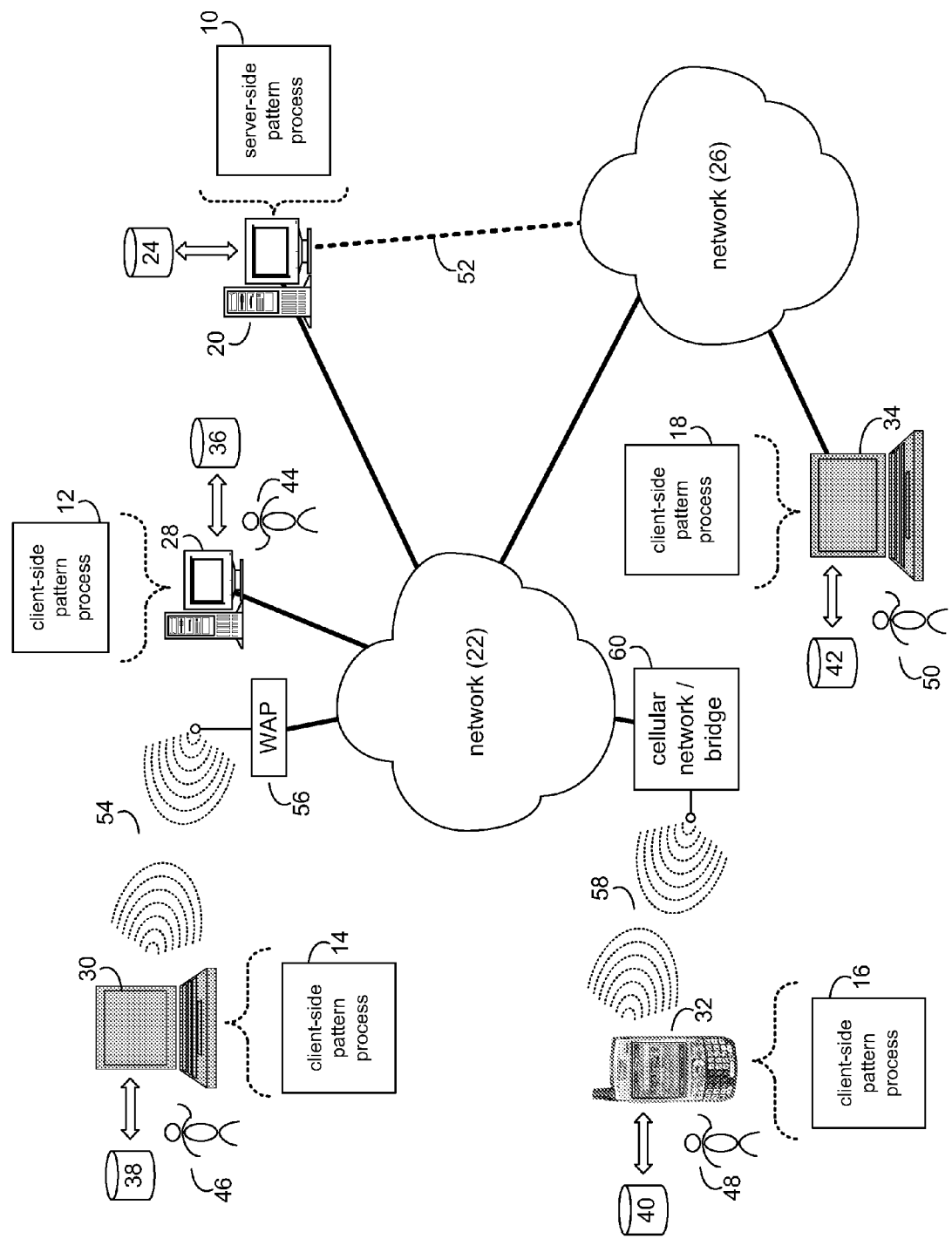
FIG. 1 is a diagrammatic view of an pattern process coupled to a distributed computing network.
Figure 2:
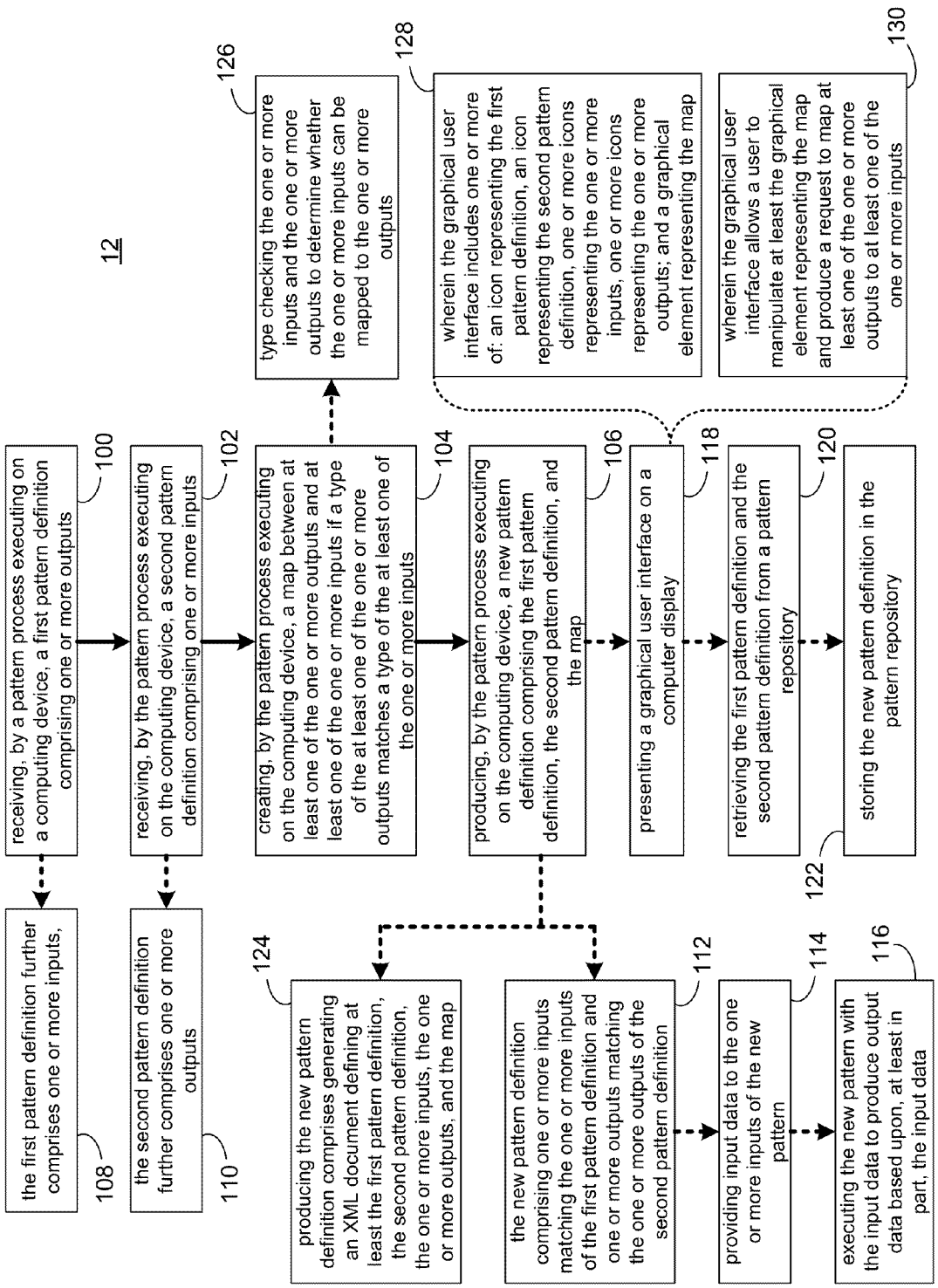
FIG. 2 is a flowchart of the pattern process of FIG. 1.

Generally, the present disclosure relates to reusing patterns while developing software. Referring to FIGS. 1 & 2, there is shown a pattern process 12. As will be discussed below, pattern process 12 may receive 100, by a pattern process executing on a computing device, a first pattern definition comprising one or more outputs. A second pattern definition comprising one or more inputs may also be received 102. A map between at least one of the one or more outputs and at least one of the one or more inputs if a type of the at least one of the one or more outputs matches a type of the at least one of the one or more inputs may be created 104.

The pattern process may be a server-side process (e.g., server-side pattern process 10), a client-side process (e.g., client-side pattern process 12, client-side pattern process 14, client-side pattern process 16, or client-side pattern process 18), or a hybrid server-side/client-side process (e.g., the combination of server-side pattern process 10 and one or more of client-side pattern processes 12, 14, 16, 18).

Server-side pattern process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side pattern process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side pattern processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side pattern processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side pattern processes 12, 14, 16, 18 and/or server-side pattern process 10 may be processes that run within (i.e., are part of) a software development application. Alternatively, client-side pattern processes 12, 14, 16, 18 and/or server-side pattern process 10 may be stand-alone applications that work in conjunction with a software development application. One or more of client-side pattern processes 12, 14, 16, 18 and server-side pattern process 10 may interface with each other (via network 22 and/or network 26) to allow a plurality of users (e.g., users 44, 46, 48, 50) to share information.

Users 44, 46, 48, 50 may access server-side pattern process 10 directly through the device on which the client-side pattern process (e.g., client-side pattern processes 12, 14, 16, 18) is executed, namely client electronic devices 28, 30, 32, 34, for example. Users 44, 46, 48, 50 may access server-side pattern process 10 directly through network 22 and/or through secondary network 26. Further, server computer 20 (i.e., the computer that executes server-side pattern process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Pattern Process

The pattern process may produce a new pattern definition comprising a first pattern definition, a second pattern definition, and the map. For the following discussion, client-side pattern process 12 will be described for illustrative purposes. Client-side pattern process 12 may be incorporated into server-side pattern process 10 and may be executed within one or more software development applications (e.g., IBM Rational Software Architect™) that allow for communication with client-side pattern process 12. However, this is not intended to be a limitation of this disclosure, as other configurations are possible (e.g., stand-alone, client-side pattern processes and/or stand-alone server-side pattern processes.) For example, some implementations may include one or more of client-side pattern processes 14, 16, 18 in place of or in addition to client-side pattern process 12.

Pattern process 12 may facilitate the combination of reusable development patterns into higher order patterns, and may further automate processing of these higher order patterns. In this way, pattern-based construction of enterprise software may be accelerated. Some standards, such as Object Management Group Asset Specification, have been set in order to enable packaging assets such as software design patterns. These patterns may be stored in a repository, and may be retrieved for reuse to improve value, quality, and productivity. Multiple reusable patterns may be combined and applied to meet domain specific requirements.

Patterns may be specified with a name, a set of attributes describing the purpose of the pattern, areas in which the pattern may be applied, and/or the input and output data types of the pattern. Attributes may be used to search for possible matching and reuse of new patterns (e.g., when combining a bigger pattern or executing patterns). The input data types may describe the type of data, and the relationship between the data, that may be expected as an input to the pattern. The output data types may describe the type of data and the relationship between the data that may be produced by (e.g., may be the output of) the pattern. For example, a pattern may expect an Integer type of "count" input, or composite data that may be composed of multiple elementary or other composite data with relationships modeled and specified in an interface specification language. With the data type specifications, a type checking may be conducted when combining patterns. In the case of a combined pattern, similarly, the input and output data types may be specified for the set of all input data of the component patterns and the set of all output data the pattern produces.

The points of variability of a pattern may be pattern inputs where special input data may be used to modify a pattern for a special purpose. Points of variability may be used to specialize the component patterns and create the combined pattern when the patterns are connected.

Compatible patterns maybe identified, documented, and/or specified. For example, the inputs and outputs of a pattern may be specified in a standard way. Once specified, these patterns may become reusable building blocks that may be composed into higher order transformational patterns. The inputs of reused and/or composed patterns may be connected (i.e., mapped) to inputs from the higher order patterns or to outputs from other transformations used in the higher order pattern.

A pattern process engine may automate the execution of composite patterns when they are applied. Pattern recipes may be a type of reusable paper asset prescribing manual steps of applying multiple patterns to create a solution. With the use of a reusable asset specification and the features described herein, these recipes may become packaged digital artifacts described formally and automated.

Referring now to FIGS. 1-4, client-side pattern process 12 may receive 100, a first pattern definition (e.g., pattern 302) comprising one or more outputs (e.g., output 304). Pattern 302 may include one or more inputs (e.g., input 300). Pattern 302 may represent a systematic transformation of one or more inputs into one or more outputs. Further, pattern 302 may be an encoding of a software development experience for a domain problem. Pattern 302 may take, as inputs, a number of arguments, and may customize the software development experience. Pattern 302 may further produce a design and/or software code for a specific instance of the domain problem.

On a high level, pattern 302 may be a description or template for how to solve a domain problem. For example, pattern 302 may be an object oriented design pattern which may describe relationships and interactions between classes and/or objects. At a low level, pattern 302 may represent transformations, which may be linked to system functions such as compilers.

Figure 3:
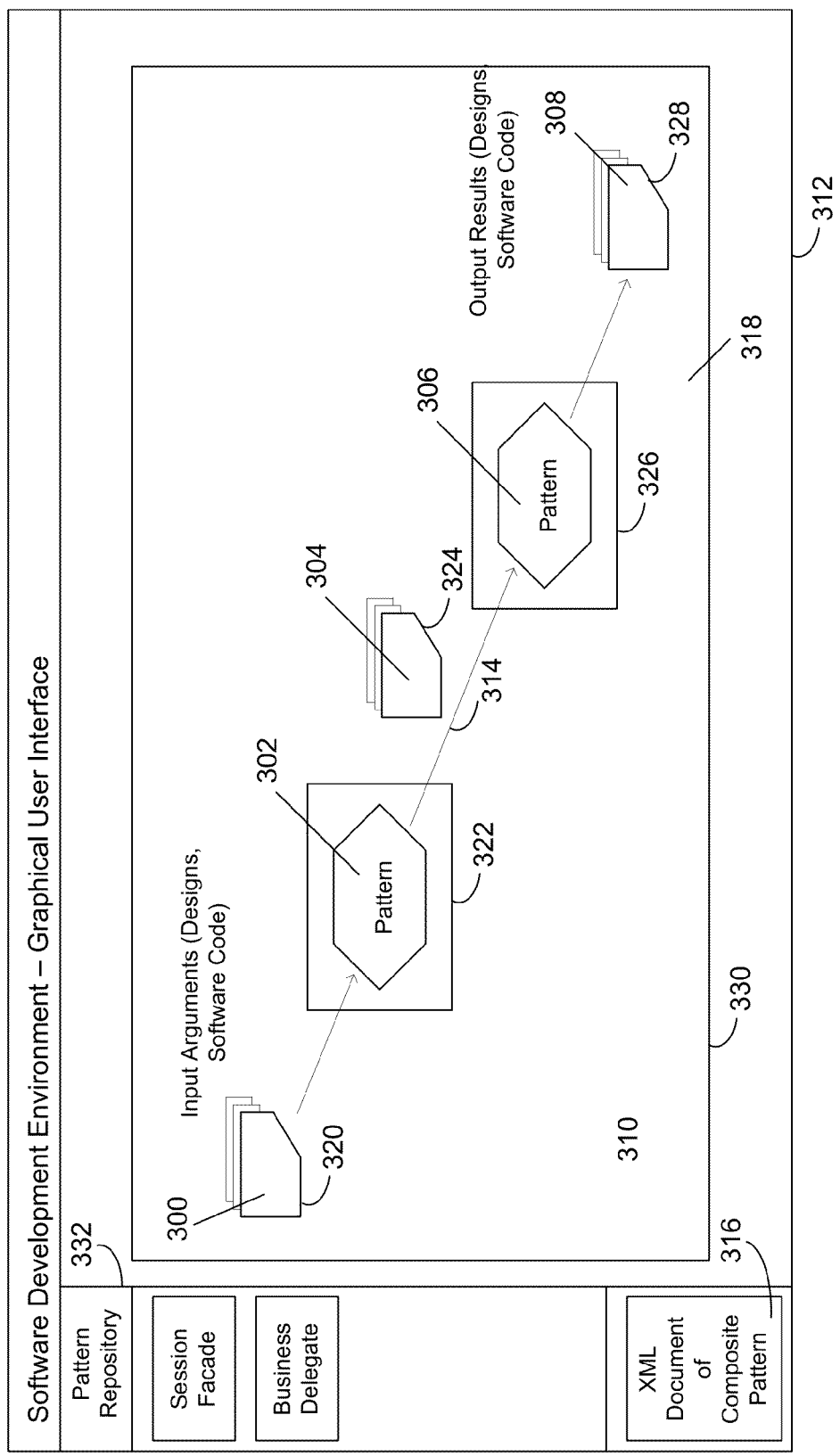
FIG. 3 is an example of a flowchart which may be associated with the pattern process.
Figure 4:
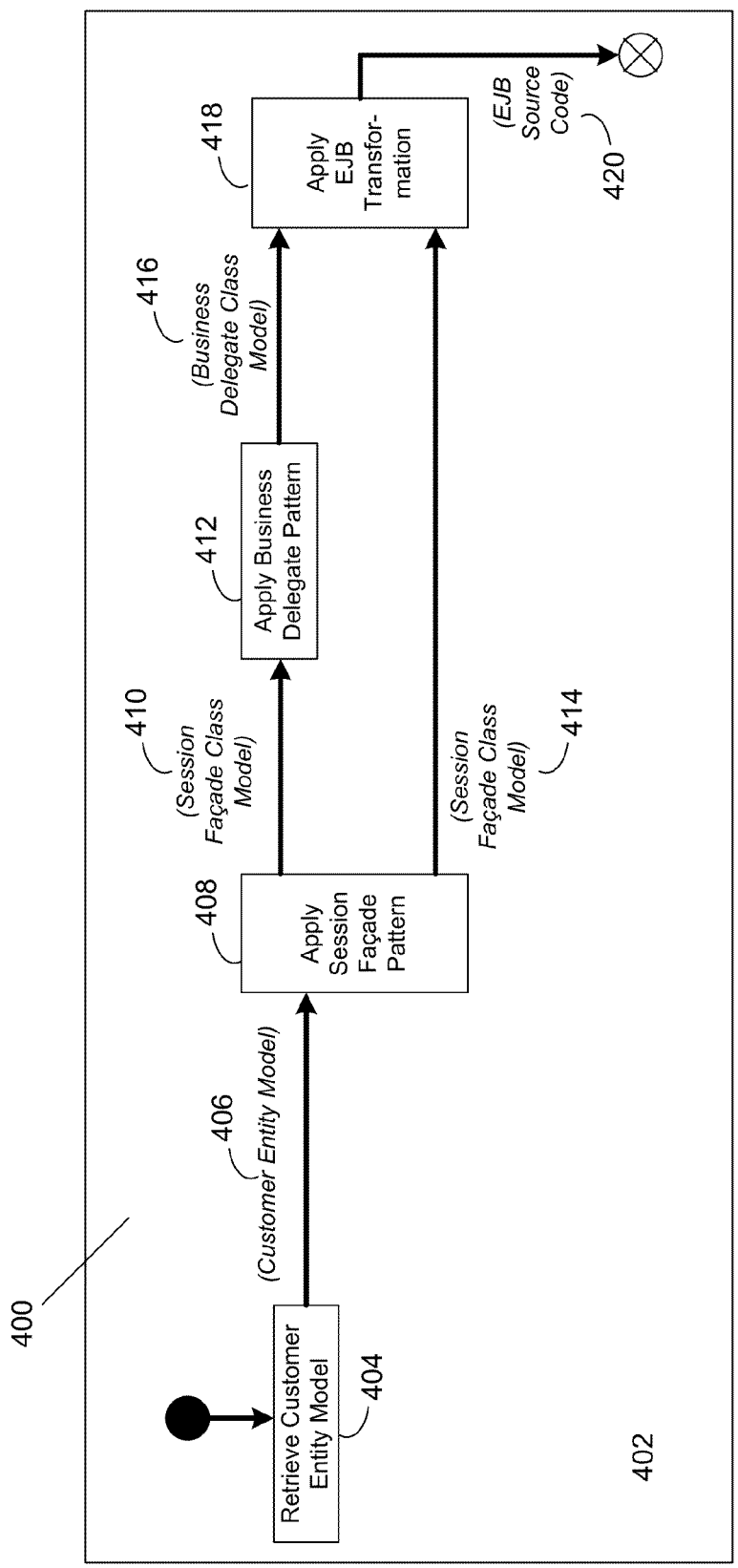
FIG. 4 is a diagrammatic flowchart which may be associated with the pattern process.

Pattern process 12 may receive 102 a second pattern definition (e.g., pattern 306) comprising one or more inputs (e.g., input 304). Pattern 306 may include one or more outputs (e.g., output 308). As will be described below, an output for one pattern (e.g., output 304 for pattern 302) may be an input for another pattern (e.g. input 304 for pattern 306). As shown in FIG. 3, input/output 304 may be an input argument (i.e., designs and/or software code) and/or an output result (i.e., designs and/or software code). Referring now to FIG. 4, for example, pattern process 12 may create 104 a map (e.g., map 402) between at least one of the one or more outputs (e.g., class model 410) and at least one of the one or more inputs (e.g., class model 410) if a type (e.g., session façade class model 410) of the at least one of the one or more outputs (e.g., class model 410) matches a type (e.g., session façade class model 410) of the at least one of the one or more inputs (e.g., class model 410). Pattern process 12 may type check 126 the one or more inputs (e.g., input 304) and the one or more outputs (e.g., output 308) to determine whether the one or more inputs can be mapped (314) to the one or more outputs. Patterns may be chained together when one pattern produces an output that may be consumed by another pattern to produce an elaborated output.

For example, pattern process 12 may produce 106 a new pattern definition (e.g., pattern 318 or 400) comprising at least the first pattern definition (e.g., pattern 302 or 408), the second pattern definition (e.g., pattern 306 or 412), and the map (e.g., map 310 or 402). The new pattern definition (e.g., pattern 318 or 400) may include one or more inputs matching the one or more inputs (e.g., input 300) of the first pattern definition (e.g., pattern 302) and one or more outputs (e.g., pattern 308) matching the one or more outputs of the second pattern definition (e.g., pattern 306). The first pattern definition (e.g., pattern 302) and the second pattern definition (e.g., pattern 306) may be retrieved (120) from a pattern repository (e.g., pattern repository 332). Pattern repository 332 may be a graphical representation of a repository that stores many pattern definitions. The repository may be, for example, a database and/or server computer (e.g., server computer 20) configured to store and provide pattern definitions to developers. The new pattern definition (e.g., pattern definition 318) may be stored (122) in the repository and/or shown in pattern repository 332. Producing the new pattern definition (e.g., pattern definition 318) may also comprise generating (124) an XML document (e.g., XML document 316) defining at least the first pattern definition (e.g., pattern 302), the second pattern definition (e.g., pattern 306), the one or more inputs (e.g., inputs 300, 304) the one or more outputs (e.g., outputs 304, 308), and the map (e.g., map 310).

The new pattern definition may then itself be used as a component of a higher order pattern. For example, the new pattern definition may later be retrieved from the pattern repository and may be executed to produce the results of the first pattern definition, the second pattern definition, and the map. Additionally, the new pattern definition may itself be mapped to one or more additional pattern definitions retrieved from the pattern repository. In this way, higher order pattern definitions may be created from pattern definitions already existing in the repository.

Referring back to the example in FIG. 4, output 410 (i.e., session façade class model) of pattern 408 (i.e., apply session façade pattern) may be consumed by (i.e., be an input for) pattern 412 (i.e., apply business delegate pattern). In other words, patterns 408 and 412 may be compatible and may be used collaboratively to solve particular problems. In this way, pattern process 12 may be a pattern process modeler which may provide and/or present 118 graphical user interface (GUI) 312 on a computer display. Pattern 408 may have its own input (e.g., input 406, or customer entity model) which may be retrieved 404 from the repository or provided by a developer.

GUI 312 may include (128) one or more of an icon representing the first pattern definition (e.g., icon 322 representing pattern 302), an icon representing the second pattern definition (e.g., icon 326 representing pattern 306), one or more icons representing the one or more inputs (e.g., icon 320 representing input 300), one or more icons representing the one or more outputs (e.g., icon 324 representing output 304); and a graphical element representing the map (e.g., element 330 representing map 310). GUI 312 may allow (130) a user to manipulate at least graphical element 310 representing the map and produce a request to map at least one of the one or more outputs (e.g., output 304 of pattern 302) to at least one of the one or more inputs (e.g., input 304 of pattern 306). Map 310 may be manipulated in this way by extending line 314 from pattern 302 to pattern 306. It should be noted that the word "map" as used herein may be used to describe an entire map of chained patterns (e.g., map 310 and/or map 402), and also may be used herein to describe the mapping of an output to an input (e.g., with line 314). In this way, new patterns (e.g., patterns 318 and 400) may be composed from existing patterns using GUI 312. The composite pattern, which may have previously been a pattern recipe, may now be processed automatically when applied, instead of manually following the recipe. While GUI 312 has been discussed herein, other configurations are possible. For example, a text based editor may be used to develop XML documents describing inputs, outputs, and transformation logic of patterns.

The patterns shown in FIGS. 3 & 4 may be referred to as nodes and may represent transformations, and the lines and/or edges may represent inputs and outputs. The map (e.g., maps 310 and 402) may be referred to as graphs. The graphs may represent data flow and flow control dependency of information required between component patterns (e.g., patterns 408 and 412). The data flow graph may represent an implicit control flow based upon a pattern application firing rule. For example, when all input arguments for a pattern (i.e., a node) are available to the pattern, the pattern application may be activated and processed. The pattern process engine may automatically process pattern composition in the model (i.e., graph and/or map of combined patterns), and may process the model using the firing rule. In other words, the pattern process engine may apply the pattern to generate an artifact (i.e., a use case, class diagram, or other byproduct produced during software development). The artifact may be used to construct software when all of its inbound arguments are readily available to the pattern. Once the entire model has been processed, multiple patterns may be applied to the specification of the diagram and a new software solution may be created. Previously, one or more practitioners may have manually applied the documented pattern recipe for the composite pattern when creating a new solution. Here, the steps of applying multiple patterns may be automated.

A pattern process node (e.g., pattern 418) may be ready to execute when all the input arguments it needs are available. For example, pattern 418 (i.e., "apply EJB Transformation" node) may be processed only when both output 416 (i.e., "business delegate class model" object) and output 414 (i.e., session façade class model object) are available. EJB may stand for Enterprise JavaBeans®, which may be a server-side component architecture for modular construction of enterprise applications. The processing of the node (e.g., pattern 418) by the pattern process engine may then produce output 420 (i.e., "EJB source code"), which may be a new software solution the new "customer entity model" object.

Figure 5:
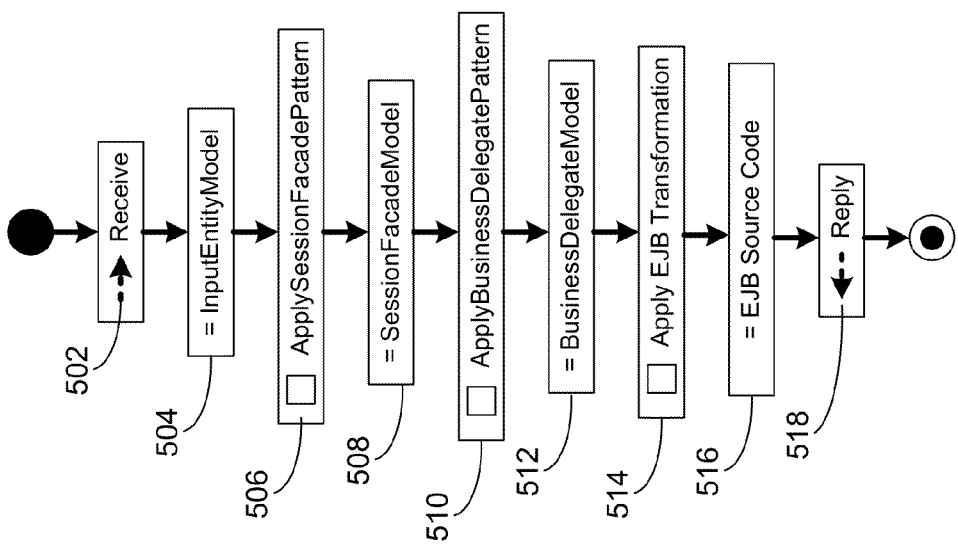
FIG. 5 is an example of a flowchart which may be associated with the pattern process.

Referring now to FIG. 5, the processing of the composite pattern shown in FIG. 4 by the pattern process engine may follow different control flows. Control flow may be followed according to a data-flow firing rule. The pattern process engine may follow a rule as shown in FIG. 5. For example, input data (indicated by arrow at 502) may be provided 114 to the one or more inputs (e.g., input 502) of new pattern 500. If the input equals model 504 (e.g., InputEntityModel), pattern 506 (e.g. SessionFacadePattern) may be applied by the pattern process engine. Model 504 may be an input of pattern 506 and pattern 506 may output model 508 (e.g., SessionFacadeModel". If the input to pattern 510 (e.g., BusinessDelegatePattern) equals model 508, pattern 510 may be applied by the pattern process engine. If the input to pattern 510 does not equal model 508, pattern 510 may not be applied by the pattern process engine, and the developer may be notified. Model 508 may be an input of pattern 510 and pattern 510 may output model 512 (e.g., BusinessDelegateModel). Similarly, BusinessDelegateModel 512 may be an input for pattern 514 (e.g., EJB Transformation) and when applied may output code 516 (e.g., EJB Source Code). In this way, pattern process 12 with a pattern process engine may execute 116 the new pattern with the input data to produce output data or code 516 (e.g., EJB Source Code, indicated by arrow at 518) based upon, at least in part, the input data.

Figure 6:
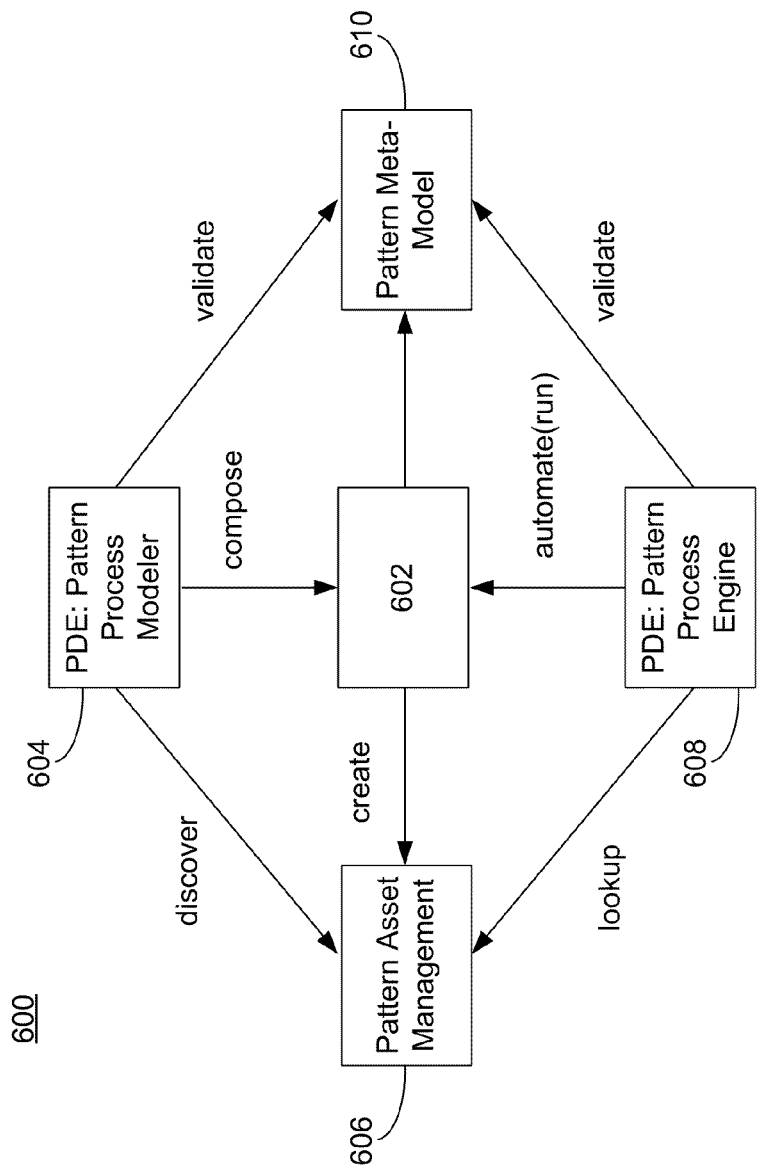
FIG. 6 is a diagrammatic view of an integrated development environment that may support the pattern process.

Referring now to FIG. 6, an exemplary Integrated Development Environment (IDE) may be used to combine and execute patterns in conjunction with pattern process 12. The IDE shown in FIG. 6 is provided for exemplary purposes only, and other IDE's derived from this example are possible to support similar functions. Combined pattern 602 may be created by pattern process modeler 604. Pattern process modeler 604 may search for component patterns from pattern asset management 606. Pattern asset management 606 may be a pattern repository that may provide support for search and management of patterns as reusable assets that may execute pattern applications and also combine patterns to create new patterns. Combined pattern 602 may be tested using pattern process engine 608. After testing, combined pattern 602 may be published as a pattern asset. Pattern process engine 608 may also be used to drive the execution of combined pattern 602 and produce results for normal pattern applications. Pattern meta-model 610 may include the rules that may be followed when specifying a pattern. These rules may include, but are not limited to, the input and output type checking that pattern process modeler 604 may validate when combining the pattern, and the rules pattern process engine 608 may validate when executing the pattern.

In one implementation, pattern process 12 may support recursion. A combined pattern (e.g., combined pattern 602) produced and tested by pattern process 12 may become a component pattern and may be combined with yet other patterns or combined patterns.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   receiving, by a pattern process executing on a computing device, a first pattern definition comprising one or more outputs;
   receiving, by the pattern process executing on the computing device, a second pattern definition comprising one or more inputs;
   creating, by the pattern process executing on the computing device, a map between at least one of the one or more outputs of the first pattern definition and at least one of the one or more inputs of the second pattern definition if a type of the at least one of the one or more outputs of the first pattern definition matches a type of the at least one of the one or more inputs of the second pattern definition, wherein the map is a graph including one or more nodes representing transformations of one or more inputs of the second pattern definition into one or more outputs of the first pattern definition and one or more lines representing the one or more inputs of the second pattern definition and the one or more outputs of the first pattern definition; and
   producing, by the pattern process executing on the computing device, a new pattern definition comprising the first pattern definition, the second pattern definition, and the map.

2. The method of claim 1 wherein:
   the first pattern definition further comprises one or more inputs;
   the second pattern definition further comprises one or more outputs; and
   the new pattern definition comprising one or more inputs matching the one or more inputs of the first pattern definition and one or more outputs matching the one or more outputs of the second pattern definition.

3. The method of claim 2 further comprising:
   providing input data to the one or more inputs of the new pattern; and
   executing the new pattern with the input data to produce output data based upon, at least in part, the input data.

4. The method of claim 1 further comprising presenting a graphical user interface on a computer display, wherein the graphical user interface includes one or more of:
   an icon representing the first pattern definition;
   an icon representing the second pattern definition;
   one or more icons representing the one or more inputs of the second pattern definition;
   one or more icons representing the one or more outputs of the first pattern definition; and
   a graphical element representing the map;
   wherein the graphical user interface allows a user to manipulate at least the graphical element representing the map and produce a request to map at least one of the one or more outputs of the first pattern definition to at least one of the one or more inputs of the second pattern definition.

5. The method of claim 1 wherein producing the new pattern definition comprises generating an XML document defining at least the first pattern definition, the second pattern definition, the one or more inputs of the second pattern definition, the one or more outputs of the first pattern definition, and the map.

6. The method of claim 1 wherein creating the map further comprises type checking the one or more inputs of the second pattern definition and the one or more outputs of the first pattern definition to determine whether the one or more inputs of the second pattern definition can be mapped to the one or more outputs of the first pattern definition.

7. The method of claim 1 further comprising one or more of:
   retrieving the first pattern definition and the second pattern definition from a pattern repository; and
   storing the new pattern definition in the pattern repository.

8. The method of claim 7 further comprising:
   retrieving the new pattern definition from the pattern repository; and
   executing the new pattern definition to produce the results of the first pattern definition, the second pattern definition, and the map.

9. The method of claim 7 further comprising:
   retrieving the new pattern definition from the pattern repository; and
   mapping the new pattern definition to one or more additional pattern definitions retrieved from the pattern repository.

10. A computer program product residing on a non-transitory computer readable storage medium having a plurality of instructions stored thereon, which, when executed by a processor, cause the processor to perform operations comprising:
    receiving, by a pattern process, a first pattern definition comprising one or more outputs;
    receiving, by the pattern process, a second pattern definition comprising one or more inputs;

creating, by the pattern process, a map between at least one of the one or more outputs of the first pattern definition and at least one of the one or more inputs of the second pattern definition if a type of the at least one of the one or more outputs of the first pattern definition matches a type of the at least one of the one or more inputs of the second pattern definition, wherein the map is a graph including one or more nodes representing transformations of one or more inputs of the second pattern definition into one or more outputs of the first pattern definition and one or more lines representing the one or more inputs of the second pattern definition and the one or more outputs of the first pattern definition; and producing, by the pattern process, a new pattern definition comprising the first pattern definition, the second pattern definition, and the map.

11. The computer program product of claim 10 wherein:
the first pattern definition further comprises one or more inputs;
the second pattern definition further comprises one or more outputs; and
the new pattern definition comprising one or more inputs matching the one or more inputs of the first pattern definition and one or more outputs matching the one or more outputs of the second pattern definition.

12. The computer program product of claim 11 further comprising instructions for:
providing input data to the one or more inputs of the new pattern; and
executing the new pattern with the input data to produce output data based upon, at least in part, the input data.

13. The computer program product of claim 10 further comprising instructions for:
presenting a graphical user interface on a computer display, wherein the graphical user interface includes one or more of:
an icon representing the first pattern definition;
an icon representing the second pattern definition;
one or more icons representing the one or more inputs of the second pattern definition;
one or more icons representing the one or more outputs of the first pattern definition; and
a graphical element representing the map;
wherein the graphical user interface allows a user to manipulate at least the graphical element representing the map and produce a request to map at least one of the one or more outputs of the second pattern definition to at least one of the one or more inputs of the first pattern definition.

14. The computer program product of claim 10 wherein producing the new pattern definition comprises generating an XML document defining at least the first pattern definition, the second pattern definition, the one or more inputs of the second pattern definition, the one or more outputs of the first pattern definition, and the map.

15. The computer program product of claim 10 wherein creating the map further comprises type checking the one or more inputs of the second pattern definition and the one or more outputs of the first pattern definition to determine whether the one or more inputs of the second pattern definition can be mapped to the one or more outputs of the first pattern definition.

16. The computer program product of claim 10 further comprising instructions for one or more of:

retrieving the first pattern definition and the second pattern definition from a pattern repository; and
storing the new pattern definition in the pattern repository.

17. The computer program product of claim 16 further comprising instructions for:
retrieving the new pattern definition from the pattern repository; and
executing the new pattern definition to produce the results of the first pattern definition, the second pattern definition, and the map.

18. The computer program product of claim 16 further comprising instructions for:
retrieving the new pattern definition from the pattern repository; and
mapping the new pattern definition to one or more additional pattern definitions retrieved from the pattern repository.

19. A computing system comprising:
at least one processor;
at least one memory architecture coupled with the at least one processor;
a first software module executed on the at least one processor and the at least one memory architecture, wherein the first software module is configured to receive, by a pattern process executing on a computing device, a first pattern definition comprising one or more outputs;
a second software module executed on the at least one processor and the at least one memory architecture, wherein the second software module is configured to receive, by the pattern process executing on the computing device, a second pattern definition comprising one or more inputs;
a third software module executed on the at least one processor and the at least one memory architecture, wherein the third software module is configured to create, by the pattern process executing on the computing device, a map between at least one of the one or more outputs of the first pattern definition and at least one of the one or more inputs of the second pattern definition if a type of the at least one of the one or more outputs of the first pattern definition matches a type of the at least one of the one or more inputs of the second pattern definition, wherein the map is a graph including one or more nodes representing transformations of one or more inputs of the second pattern definition into one or more outputs of the first pattern definition and one or more lines representing the one or more inputs of the second pattern definition and the one or more outputs of the first pattern definition; and
a fourth software module executed on the at least one processor and the at least one memory architecture, wherein the fourth software module is configured to produce, by the pattern process executing on the computing device, a new pattern definition comprising the first pattern definition, the second pattern definition, and the map.

20. The computing system of claim 19 wherein:
the first pattern definition further comprises one or more inputs;
the second pattern definition further comprises one or more outputs; and
the new pattern definition comprising one or more inputs matching the one or more inputs of the first pattern definition and one or more outputs matching the one or more outputs of the second pattern definition.

* * * * *